Patented Sept. 2, 1924.

1,507,346

UNITED STATES PATENT OFFICE.

ROY A. DRISCOLL, OF BAY POINT, CALIFORNIA, ASSIGNOR TO GENERAL ELECTRIC FURNACE CORPORATION, OF RENO, NEVADA, A CORPORATION OF NEVADA.

METALLURGICAL PROCESS.

No Drawing.      Application filed February 9, 1921. Serial No. 443,641.

*To all whom it may concern:*

Be it known that I, ROY A. DRISCOLL, a citizen of the United States, residing at Bay Point, in the county of Contra Costa and State of California, have invented new and useful Improvements in Metallurgical Processes, of which the following is a specification.

This invention relates to a metallurgical process.

It is the principal object of the present invention to provide an economical method of producing pig iron and like products within an electrical furnace which utilizes iron and steel turnings and other small scrap metal.

Heretofore pig iron has been made from scrap metal within an electric furnace, but in all known instances it has been necessary to utilize some heavy electrical resistant in the furnace to produce the necessary reduction of the scrap, as for example, the addition of a quantity of iron ore. Such practice has placed an unnecessary overload upon the apparatus, and has required that excessive amounts of electricity were needed to overcome the resistance and break down the metal. The present invention, therefore, contemplates an elimination of the unnecessary expense, loss of time and material in connection with the production of pig iron from scrap metals by providing a minimum resistant for the scrap and at the same time thoroughly mixing finely divided ingredients required, such as a proportion of carbon silica, and in some instances special metals which would produce alloys when mixed with the melted scrap.

This invention is carried out by thoroughly mixing the scrap metal with some material which will form a thin film or layer over the outer surface of each particle of the scrap metal. This might be accomplished in numerous ways after immersion of the scrap in water, oil, and other suitable liquids; in some instances with semi-solids, such as tar, pitch, and the like. In any event it is intended to form a thin resistant layer around the particles, with the addition of heavy resistant material, such as ore, to the charge placed in the furnace. It will be readily recognized that if a minimum resistant action is produced between the particles, which at the same time will be sufficient for the creation of the necessary heat as generated by the electric current, a considerable amount of time will be saved, as well as a conservation of material and electrical energy.

To obtain the proper reduction of the scrap, and to add necessary ingredients for pig iron of a desired formula, it is practical to add various ingredients to the film forming agent. It is preferable to add these ingredients in a finely divided condition, so that they may be disseminated throughout the mass of scrap to be used, and will thus insure that the entire run of metal from the furnace will be of uniform consistency. Finely divided carbon may be used as a reducing agent, and also a desired amount of silica. If this is done, each particle of the scrap will be covered with a thin film of the resistant agent, within which uniform quantities of carbon and the silica will be distributed. It will therefore be possible to continuously operate the furnace, charging in the treated scrap and drawing off the uniform molten metal.

When alloy metals are to be produced, it is only necessary to prepare the special metal in a finely divided state and thoroughly mix it with the resistant agent, after which the mixture of the resistant and the various ingredients may be applied to the particles of scrap metal.

In operation, it will therefore be necessary to prepare the finely divided special metals, reducing agent, or other ingredient required to produce a certain formula, thoroughly mixing the ingredients with the liquid or semi-solid resistant agent, and thoroughly mixing the emulsion, thus formed, with the particles of scrap in sufficient quantities to cause the emulsion to accumulate on the surface of the scrap in a film. The metal thus treated is then placed in an electric furnace, where the resistance of the film to the flow of electric energy between the poles of the furnace, will create sufficient heat to reduce the metal to a molten state, thereby insuring that as the metal melts it will carry the desired additional ingredients into the mass in a uniform proportion throughout.

It will thus be seen that this process will insure the production of a uniform product formed of desired ingredients in predetermined proportions, and that the process will be carried out with a minimum current consumption, and a continuous maximum recovery of the metal desired.

Having thus described my invention, what

I claim and desire to secure by Letters Patent is:

1. A method of utilizing small particles of scrap metal for the production of pig iron, which consists in subjecting the particles of metal in a more or less loose condition to the action of a fluid capable of forming a film over the surface of the particles, the film fluid comprising an electrical resistant carrying a desired reducing agent and other ingredients, all of which are uniformly distributed throughout the fluid in a finely divided state, and finally subjecting the material to an electrical furnace to melt down the metal particles and at the same time cause a reduction of the reducing agent.

2. A method of utilizing metal in a finely divided condition for the production of pig iron, which consists in treating the particles of the material with an emulsion forming an electrical resistant film over the particles, the film including thoroughly mixed preparations of finely divided carbon and silica and finally subjecting the material thus treated to an electrical furnace.

3. A method of recovering scrap iron and steel, which consists in first treating the metal to form an electric resistant film over the surface thereof, said film carrying finely divided and uniformly distributed particles of carbon and silica, thereafter placing the metal thus treated in an electric furnace, and reducing the same to a molten mass, which may be continuously withdrawn from the furnace as other similarly treated metal scrap is fed into the furnace.

4. A method of producing pig iron from scrap iron and steel, which consists in first preparing a mixture of an electric resistant, a finely divided reducing agent, and silica, thereafter immersing the scrap metal in said mixture to form a resistant film thereover, and then placing the metal thus treated in an electric furnace, where it is reduced to a molten mass.

5. A method of producing metallic products in an electrical furnace, which consists in forming an electrical resistant film over the surfaces of the various metalliferous ingredients, of which final product is to consist, thereafter feeding the material thus treated to an electrical furnace.

6. A method of producing pig iron from small particles of scrap metal which consists in admixing with thoroughly mixed proportions of finely divided carbon and silica, an electrical resistant film forming agent and a carrier for the necessary proportion of carbon and silica to produce a uniform product.

7. A method of producing pig iron from small particles of scrap metal which consists in forming a film of oil over the surface of each of the particles, the film forming an electrical resistant over the surface of each of the particles and capable of carrying a reducing agent.

8. A method of utilizing small particles of scrap metal for the production of pig iron which consists of subjecting the particles in a more or less loose condition to the action of a fluid capable of forming a heat resisting film over the surface of each particle and carrying a silicate reducing agent, and finally subjecting the particles thus treated to an electrical furnace to melt down the particles and at the same time cause a reduction of silicate to take place.

ROY A. DRISCOLL.